United States Patent
Fairgrieve et al.

(10) Patent No.: US 6,348,236 B1
(45) Date of Patent: *Feb. 19, 2002

(54) PROCESS FOR THE PREPARATION OF WATER BLOCKING TAPES AND THEIR USE IN CABLE MANUFACTURE

(75) Inventors: Stuart Paterson Fairgrieve, Kidlington; Jennifer Clare Watts, Yarnton, both of (GB); Joel David Gruhn, Barrington, RI (US); Phillip Douglas Shows, Hudson, NC (US)

(73) Assignee: Neptco, Inc., Pawtucket, RI (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/697,437

(22) Filed: Aug. 23, 1996

(51) Int. Cl.$^7$ .............................. B05D 3/02; G02B 6/44
(52) U.S. Cl. ................................ 427/372.2; 427/385.5; 427/388.4; 427/393.5; 385/100
(58) Field of Search ................................. 428/515, 457, 428/464, 461, 459, 481, 483, 507; 427/372.2, 385.5, 384, 388.4, 393.5; 385/100

(56) References Cited

U.S. PATENT DOCUMENTS

| | | | |
|---|---|---|---|
| 3,926,981 A | 12/1975 | Clauss et al. | 260/243 R |
| 3,966,679 A | 6/1976 | Gross | 260/47 EA |
| 4,017,653 A | 4/1977 | Gross | 427/385 A |
| 4,090,013 A | 5/1978 | Ganslaw et al. | 526/15 |
| 4,154,898 A | 5/1979 | Burkholder, Jr. | 428/500 |
| 4,322,574 A | 3/1982 | Bow et al. | 174/107 |
| 4,837,077 A | 6/1989 | Anton et al. | 428/240 |
| 4,933,012 A * | 6/1990 | Goetze et al. | 106/204 |
| 4,963,695 A | 10/1990 | Agostinelli et al. | 174/23 C |
| 5,010,209 A | 4/1991 | Agostinelli et al. | 174/23 C |
| 5,020,875 | 6/1991 | Arroyo et al. | 350/96.23 |
| 5,071,681 A * | 12/1991 | Manning et al. | 427/392 |
| 5,126,382 A * | 6/1992 | Hollenberg et al. | 524/56 |
| 5,188,883 A | 2/1993 | Rawlvk | 428/189 |
| 5,204,175 A | 4/1993 | Umeda et al. | 428/288 |
| 5,268,030 A * | 12/1993 | Floyd et al. | 106/450 |
| 5,280,079 A | 1/1994 | Allen | 525/329.2 |
| 5,582,674 A * | 12/1996 | Patterson et al. | 156/290 |

FOREIGN PATENT DOCUMENTS

| | | |
|---|---|---|
| EP | 0 024 631 A1 | 3/1981 |
| EP | 0 357 474 A1 | 3/1990 |
| EP | 0 482 703 A1 | 4/1992 |
| EP | 0 558 207 A2 | 9/1993 |
| EP | 0 685 855 A1 | 12/1995 |
| EP | 0 702 031 A2 | 3/1996 |
| JP | 04-257441 | 9/1992 |
| JP | 05-194798 | 10/1992 |
| JP | 05-146475 | 6/1993 |
| JP | 05-148475 | 6/1993 |
| JP | 07-292142 | 11/1995 |
| JP | 07-306343 | 11/1995 |
| WO | WO 96/23024 | 8/1996 |

* cited by examiner

Primary Examiner—Paul Thibodeau
Assistant Examiner—Holly C. Rickman
(74) Attorney, Agent, or Firm—Mintz, Levin, Cohn, Ferris, Glovsky and Popeo, P.C.

(57) ABSTRACT

A process for the manufacture of a water blocking tape for use in cable manufacture, which process comprises the steps of:

(i) forming a coating of an aqueous solution of a water soluble polymer containing anionic groups and a multivalent ionic crosslinking agent on at least one surface of a substrate material selected from the group consisting of a metal foil, a plastic film, a plastic sheet, a multilayer film, and a laminate of at least two thereof; and (ii) drying and/or curing the coating in order to form a partially crosslinked water swellable polymer coating on the at least one surface of the substrate material. Water blocking tapes are also provided which comprise a substrate material having a coating on at least one surface thereof of a water soluble polymer containing anionic groups which is partially crosslinked with a multivalent ionic crosslinking agent. The preferred water soluble polymer containing anionic groups is an acrylic or methacrylic acid (co)polymer.

12 Claims, No Drawings

PROCESS FOR THE PREPARATION OF WATER BLOCKING TAPES AND THEIR USE IN CABLE MANUFACTURE

FIELD OF THE INVENTION

The present invention relates to a process for the preparation of water blocking tapes and to the use of such tapes in cable manufacture and, in particular, their use in the manufacture of communications cables using fiber optics.

BACKGROUND OF THE INVENTION

Cables, in particular communication cables using fiber optics, can quickly be damaged by water ingress, particularly if the water travels along the inside of the cable to splices, junctions, signal boosters etc. In the case of underwater or buried cables this problem can be quite serious. The ingress of water into the cable may be simply by the diffusion of water through the outer polymeric jacket, or by rupture of the outer jacket. Rupturing of the outer jacket may be caused by rodent or insect attack, by impact or by abrasion.

PRIOR ART

A number of methods exist for combatting this problem. The most widely used approach is to fill the inner regions of the cable with a hydrophobic gel-like compound, such as that sold under the Trade Name Rheogel. This approach suffers from a number of disadvantages, including inefficiency of filling all of the voids within the cable, the process is messy and time consuming, and the adhesion of cable splices is difficult to achieve due to the gel interfering with welding operations or adhesives.

Superabsorbent polymers, e.g. partially crosslinked polymers which absorb many times their own weight in water, and swell considerably without dissolving, to form a gel have also been used. Such superabsorbent polymers have been provided in the form of wide sandwich tapes consisting of a layer of a superabsorbent polymer powder sandwiched between two layers of a non-woven fabric. Tapes of this type have been described, for example, in U.S. Pat. No. 4,837,077 and EP-A-0024631. However, these products are expensive and cause considerable unwanted increases in cable diameters due to their thickness.

Fibrous substrates with superabsorbent polymer incorporated therein, such as aramid substrates, have also been used, particularly as strengthening wraps for the inner portions of cables. Substrates of this type have been described in EP-A-0482703. However, the methods used to deposit the superabsorbent onto the fibers are not particularly effective and do not result in a high level of superabsorbent on the fibrous substrate. Furthermore, the fibers are not effectively bound together which leads to potential problems of loose fibers during cable assembly processes. Some methods of applying the superabsorbent to the fibers involve the use of organic solvents, with consequential environmental concerns.

In EP-A-0685855 we describe a water blocking composite for use in cables which comprises a strengthening member or buffer tube impregnated with or coated with a mixture of a thermoplastic resin and a water-swellable particulate material. Although these water blocking composites possess certain advantages, they are based on thermoplastic resins which limits their mode of application and the thickness of the coatings that can thereby be applied.

U.S. Pat. No. 5,188,883 discloses a composite tape structure for use in cables having a metal tape layer and a layer of a swellable water blocking material bonded thereto. The layer of water blocking material may be formed from tape impregnated with or provided with a particulate swelling material, or the particulate material may be applied directly to and bonded to the metal tape layer.

U.S. Pat. No. 5,204,175 discloses a water blocking tape made by impregnating a fabric substrate with a metal salt of acrylic acid in monomeric form, a covalent crosslinking agent and a water soluble resin, and then heating the impregnated fabric substrate to copolymerise the monomer and the crosslinking agent in the presence of the water soluble resin.

EP-A-0357474 discloses a fabric impregnated with a formulation which crosslinks in situ on heating to form an absorbent polymer.

U.S. Pat. No. 4,017,653 discloses water swellable absorbent articles which are coated with a dry water swellable polyelectrolyte formed by coating the article with a solution of a carboxylic synthetic polyelectrolyte and a covalent crosslinking agent, and heating the coated article to crosslink the polyelectrolyte. The absorbent articles are generally coated fibrous substrates which can be used in forming diapers, tampons, meat trays or bath mats. Also disclosed are free standing films of the water swellable polyelectrolyte. EP-A-0702031 discloses an aqueous composition of an absorbent polymer for use in preparing superabsorbent materials such as superabsorbent cellulosic fibers and superabsorbent nonwoven webs. The aqueous polymer composition comprises 20–90% of an $\alpha,\beta$-ethylenically unsaturated carboxylic acid monomer and at least one softening monomer, the aqueous composition being adjusted to pH 4–6 with an alkali metal hydroxide or an alkaline earth metal hydroxide and containing a divalent or trivalent metal crosslinking compound.

We have now developed a process for the preparation of water blocking tapes for use in the manufacture of cables which does not involve the of particulate water swellable materials, the use of thermoplastic binder resins or the use of covalent crosslinking agents which may be toxic and difficult to handle.

SUMMARY OF THE INVENTION

Accordingly, the present invention provides a process for the manufacture of a water blocking tape for use in cable manufacture, which process comprises the steps of:

(i) forming a coating of an aqueous solution of a water soluble polymer containing anionic groups and a multivalent ionic crosslinking agent on at least one surface of a substrate material selected from the group consisting of a metal foil, a plastic film, a plastic sheet, a multilayer film, and a laminate of at least two thereof; and (ii) drying and/or curing the coating in order to form a partially crosslinked water swellable polymer coating on the at least one surface of the substrate material.

In another aspect the present invention provides a water blocking tape which comprises a substrate material as above defined having a coating on at least one surface thereof of a water soluble polymer containing anionic groups which is partially crosslinked with a multivalent ionic crosslinking agent.

DETAILED DESCRIPTION OF THE INVENTION

The water soluble polymer used in the present invention contains anionic groups which are preferably selected from carboxyl, sulfonate, sulfate or phosphate groups, most preferably carboxylate groups. Examples of water soluble polymers for use in the invention are acrylic or methacrylic acid (co)polymers, itaconic acid (co)polymers, maleic anhydride copolymers, carboxymethylcellulose, 2-acrylamide-2-methylpropane sulfonic acid (co)polymers (such as AMPS from Lubrizol Corporation), polysaccharides and carboxymethyl starches. The most preferred polymers are acrylic and methacrylic acid homopolymers and the (co)polymers thereof.

The description of the process of the present invention will be made with reference to acrylic and methacrylic acid (co)polymers, but it will be understood that this is by way of example only, the process being applicable to the preparation of coatings based on other water soluble polymers as discussed above.

In carrying out the process of the present invention one or both sides of the substrate material which is selected from a metal foil, a plastic film, a plastic sheet or a multilayer film material, or a laminate of two or more thereof has a coating of an acrylic or methacrylic acid (co)polymer and a multivalent ionic crosslinking agent formed thereon. Generally, the coating will be formed as a continuous or discontinuous pattern on the substrate surface by coating the substrate with a coating solution comprising an aqueous solution of an acrylic or methacrylic acid (co)polymer containing the multivalent ionic crosslinking agent. The coating formulation is generally prepared by preparing an aqueous solution of the acrylic or methacrylic acid (co)polymer and then optionally partially neutralizing the acid, for example with an alkali metal hydroxide. The solution is then neutralized or maintained at a pH of above 7 and the required level of a multivalent ionic metal salt is added thereto. Alternatively, the coating formulation may be prepared by adding the multivalent ionic crosslinking agent to the solution of the partially neutralized or unneutralized acid (which will result in solids precipitation and/or gel formation) and then adding a base to redissolve the solids and provide the desired coating formulation. The pH of the solution is maintained at above 7 in order that the polymer and the multivalent metal ions remain in solution without crosslinking until the solution has been coated onto the substrate surface and the coating dried or cured in order to form a partially crosslinked water swellable polymer coating on the said surface. The pH of the solution may be adjusted, for example, with a combination of ammonium carbonate and ammonium hydroxide, or ammonium hydroxide alone. Once the solution has been coated onto the substrate, the loss of ammonia and water in step (ii) of the process of the invention results in activation of the crosslinking agent and the formation of the partially crosslinked water swellable polymeric material.

It will be understood by those skilled in the art that the coating on the substrate surface may be formed by first coating the substrate with a solution of an acrylic or methacrylic acid (co)polymer and thereafter applying a coating of a multivalent ionic crosslinking agent thereto. It is preferred, however, to apply both the polymeric material and the multivalent ionic crosslinking agent as a single solution.

The molecular weight of the starting polymeric material should be such that the final coating exhibits good film-forming properties and is preferably in the range of from 100,000 to 300,000. The polymer solution which is applied to the surface of the substrate will generally have a solids concentration in the range of from 1 to 50% by weight, preferably from 5 to 25% by weight, the actual value to be used depending upon the solution viscosity required in the particular coating method selected for coating the substrate surface. The amount of the multivalent ionic crosslinking agent which is incorporated into the coating will depend upon the required gel forming properties of the water swellable coating. Low levels of the ionic crosslinking agent will tend to give fast water uptake rates, but relatively weak gels, whilst higher levels will provide slower water uptake rates but stronger gels. Generally, the level of the ionic crosslinking agent will be in the range of from 0.001 to 0.1 molar equivalents, preferably 0.02 to 0.05 molar equivalents, of the multivalent ions based on the polymer.

The multivalent crosslinking agent preferably comprises an iron, aluminium or zirconium salt, or mixture thereof. Ammonium zirconium carbonate is the preferred salt for use in the present invention.

Other additives may be used in the coatings of the present invention, for example anti-blocking agents, colourants, heat stabilizers, surfactants, miscible co-solvents, such as lower alcohols, or any other additives known in the art.

The polymer solution may be incorporated onto or into the chosen substrate by any of a variety of well established methods, such as impregnation by dipping in a suitable bath, gravure printing, screen printing, spraying, doctor blade spreading or roller coating. The process of the present invention will generally be carried out using a wide film or sheet of material, which will then be cut to the predetermined required tape widths in a subsequent process.

It will be understood by those skilled in the art that the substrate which is treated in accordance with the process of the present invention may, if required, be pre-treated in order to increase its receptivity to the application of the coating compositions used in the present invention. Such pre-treatments may include plasma treatment, flame treatment, chemical etching, or the use of a primer coating.

The water blocking tapes of the present invention and the process for their production possess certain advantages over the prior art. The water blocking tapes of the present invention do not have any lower thickness limit which is dictated by the particle size of prior art particulate water swellable polymeric materials and no binder polymer is required. Accordingly, the coating is a completely water swellable, active polymer. The coated water blocking tape has a good flexibility and this lends to its use of application in the formation of the cables. The water blocking tapes of the present invention are prepared by a process which is aqueous based, and uses cheap polymeric starting materials. The ionic crosslinking agents which are used in the process are easier to disperse than covalent crosslinking agents and are less toxic and more easily handled than the covalent crosslinking agents used in the art.

The viscosity of the coating formulations can be varied over a wide range in order to suit a variety of coating methods and coating weights. Furthermore, the general strength of the polymeric material on uptake of water can be controlled in order to suit individual cable design criteria. The process of the invention is applicable to the coating of a wide variety of substrates and thus can be used to coat components which are already used in a cable design and thus a cable can be rendered water blocking with virtually no increase in the complexity of assembly and the diameter of the cable with a minimum increase in weight. In the preferred embodiment of the invention the pH is used to control the activity of the ionic crosslinking agent and this provides the coating formulation with a good shelf life prior to application and use.

The present invention also includes within its scope a cable which incorporates therein a water blocking tape as hereinbefore described. The water blocking tape may comprise an intermediate strengthening member or an outer strengthening wrap of the cable.

The present invention will be further described with reference to the following nonlimiting Examples.

EXAMPLE 1

A coating solution was prepared on a laboratory scale as follows: 156.3 g of a commercial 25% solids polyacrylic acid solution (Goodrite K702; BF Goodrich Company) was made up to 279 g (14% solids) with deionised water. 10.85 g sodium hydroxide was added to this solution to give a 50% saponified product. 16.28 g ammonium carbonate was slowly added to the mixture, and the pH adjusted to 8.5 by a further addition of ammonium hydroxide. 9.06 g of ammonium zirconium carbonate solution (Bacote 20; Magnesium Elektron Ltd.) was added dropwise to provide 0.03 molar equivalents of zirconium ions as crosslinking agent with respect to polyacrylic acid. The resultant coating formulation had a viscosity of 310 cP (Brookfield No. 2 spindle; 30 rpm).

This formulation was coated onto an aluminium/polypropylene/aluminium three layer tape, using a K-bar wire wound rod hand coater, and dried at ambient temperature for 24 hours, to give a coating weight of 4.5 g/sq.m. The water uptake of the thus produced water swellable tape was assessed by immersing portions of the tape in tap water at room temperature for 30 seconds. A water uptake value of 225 g/sq.m was obtained.

In order to test the tape under field conditions, a cable was constructed using the above prepared waterblocking tape. The design chosen was a so-called Trishield cable television cable comprising a single copper wire surrounded by a thick layer of a foamed polyolefin insulator with the experimental tape being wrapped lengthways around this insulator, with the water swellable face outwards. An aluminium wire braid layer was placed over the tape, a further aluminium foil layer was placed over the braid and a final outer jacket was provided by a heat shrinkable tube A lm length of this test cable was tested for waterblocking ability by subjecting one end of the specimen to a lm head of water. A sample was deemed to have passed the test if no water appeared at the other end of the specimen within 24 hours. The test piece passed the test, while a similar specimen made with an uncoated aluminium/polypropylene/aluminium three layer tape failed within 1 minute.

The formulation was also coated onto both sides 5 of a sample of the above tape, and the resultant product incorporated into a cable design of so-called Quadshield construction, where there are two layers of aluminium wire braid, the tape being placed between the two braids. A im cable specimen of this type also passed the 24 hour lm head of water test.

EXAMPLES 2 to 6

Coating formulations were made up in the same manner as Example 1, but with different initial levels of polyacrylic acid. The additive levels was adjusted to take account of the different % solids in the solutions. Thus a range of viscosities was obtained, suitable for application of the formulations to substrates using a variety of coating methods.

| Example | % Solids | Viscosity (cP) |
| --- | --- | --- |
| 2 | 10 | 127 |
| 3 | 12 | 215 |
| 4 | 15 | 384 |
| 5 | 17 | 595 |
| 6 | 20 | 1057 |

EXAMPLES 7 to 9

Coating formulations similar to that given in Example 1 were made up, but with varying levels of zirconium ions as the crosslinker. These were coated onto the aluminium/polypropylene/aluminium tape in the manner as described in Example 1 at a coating weight of 5.5 g/sq.m, and tested for water uptake under the conditions as described in Example 1.

| Example | Molar Equivalent Zr Crosslinker | Water Uptake (g/sq.m) |
| --- | --- | --- |
| 7 | 0.030 | 179 |
| 8 | 0.035 | 125 |
| 9 | 0.040 | 96 |

While the water uptake value did decrease on increasing of crosslinking ions level, it was noted that the gel strength of the swollen polymer increased considerably.

EXAMPLE 10

The formulation described in Example 1 was prepared under production conditions to give a batch of about 45 L of coating solution. This was coated onto 1.4 m wide rolls of an aluminium/polyester aluminium tape by a gravure roller process to give a dry coating weight of about 3.1 g/sq.m. The coated tape was dried through a dual oven system at 105° C. and 145° C. The reel was then slit into tapes of 31.8 mm width. A water uptake value in excess of 300 g/sq.m was obtained under the test conditions as described in Example 1.

A Trishield cable was made using this tape, in the manner as described in Example 1. A lm length of this cable passed the 24 hour lm head of water test.

EXAMPLES 11 to 13

55.8 g of a 25% solids solution of polyacrylic acid was made up to 279 g with deionised water to provide a 5% solids solution. 3.87 g sodium hydroxide was added to this solution to give a 50% saponified product. 0.013 molar equivalents of metal salt were added (as a 1 wt % solution in deionised water) which resulted in a slurry, of precipitated solids appearing. Sufficient ammonium hydroxide was added to redissolve the precipitate, and achieve a pH of about 8.5. Films cast from the solutions onto metal foil substrates showed moderate to good swelling characteristics when immersed in water. The salts used in the Examples were as given in the table below:

| Example | Salt |
| --- | --- |
| 11 | Ammonium zirconium carbonate |
| 12 | Aluminium chloride |
| 13 | Iron (III) chloride |

What is claimed is:

1. A process for the manufacture of a water blocking tape for use in cable manufacture, which process comprises the steps of:
   (a) providing a substrate material having at least one surface, the substrate material being substantially flat and flexible to allow said substrate material to be wrapped about cable components;
   (b) preparing an aqueous solution consisting of:
      (i) a water soluble, partially neutralized, (meth)acrylic acid homopolymer;
      (ii) a multivalent ionic crosslinking agent; and
      (iii) a crosslinking suppressing agent that maintains the multivalent ionic crosslinking agent in solution until the solution has been coated onto the substrate material;
   said aqueous solution being neutralized to a pH of greater than 7;
   (c) forming a coating of said aqueous solution on said at least one surface of said substrate material, the coating having a surface substantially in complete contact with said at least one surface of said substrate material; and
   (d) drying said coating on said at least one surface of said substrate material to sequentially or concurrently remove substantially all ammonia and water therefrom to form an ionically partially crosslinked water swellable polymer coating on said at least one surface of said substrate non-porous substrate material, said coating being sufficiently flexible to resist cracking and peeling when said water blocking tape is wrapped about cable components during cable manufacture.

2. The process of claim 1 wherein said substrate material is selected from the group consisting of a metal foil, a plastic film, a plastic sheet, a multilayer film, and a laminate of at least two thereof.

3. The process of claim 1 wherein said (meth)acrylic acid homopolymer is partially neutralized with an alkali metal hydroxide.

4. The process of claim 3 wherein the (meth)acrylic acid homopolymer has a molecular weight of between about 100,000 and about 300,000.

5. The process of claim 1 wherein the multivalent ionic crosslinking agent is selected from the group consisting of iron, aluminum and zirconium salts and mixtures thereof.

6. The process of claim 1 wherein the multivalent ionic crosslinking agent comprises ammonium zirconium carbonate.

7. The process of claim 1 wherein the multivalent ionic crosslinking agent is used in an amount to provide from about 0.001 to about 0.1 molar equivalents based on the water soluble (meth)acrylic acid homopolymer.

8. The process of claim 1 wherein the multivalent ionic crosslinking agent is used in an amount to provide from about 0.02 to about 0.05 molar equivalents based on the water soluble (meth)acrylic acid homopolymer.

9. The process of claim 1 wherein said aqueous solution has a solids content in the range of from 5 to 25% by weight.

10. The process of claim 1 wherein the substrate formed in step (d.) is cut to a required width to form a tape.

11. The process of claim 1, wherein the crosslinking suppressing agent includes ammonium hydroxide.

12. The process of claim 11, wherein the crosslinking suppressing agent further includes ammonium carbonate.

* * * * *